United States Patent [19]

Puri

[11] 4,439,458

[45] Mar. 27, 1984

[54] PREPARATION OF CITRUS JUICES, CONCENTRATES AND DRIED POWDERS WHICH ARE REDUCED IN BITTERNESS

[75] Inventor: Ajai Puri, Altamonte Springs, Fla.

[73] Assignee: The Coca-Cola Company, Atlanta, Ga.

[21] Appl. No.: 371,861

[22] Filed: Apr. 26, 1982

[51] Int. Cl.³ .............................................. A23L 2/00
[52] U.S. Cl. ................................ 426/330.5; 426/422
[58] Field of Search .................... 426/271, 422, 330.5, 426/333, 590; 521/31, 33, 38

[56] References Cited

U.S. PATENT DOCUMENTS

| | | | |
|---|---|---|---|
| 2,510,797 | 6/1950 | Burdick et al. | 426/422 |
| 2,681,907 | 6/1954 | Wender | 260/210 |
| 3,238,153 | 3/1966 | Hagge et al. | 521/33 |
| 3,463,763 | 8/1969 | Griffiths | 260/78 |
| 3,989,854 | 11/1976 | Chandler et al. | 426/422 |
| 4,024,334 | 2/1975 | Chandler et al. | 536/65 |
| 4,154,862 | 5/1979 | Guadagni et al. | 426/536 |
| 4,282,264 | 8/1981 | Magnolato | 426/599 |

FOREIGN PATENT DOCUMENTS

| | | |
|---|---|---|
| 882796 | 3/1943 | France . |
| 2125539 | 10/1974 | France . |
| 57-118971 | 1/1982 | Japan . |
| 233394 | 10/1944 | Switzerland . |

OTHER PUBLICATIONS

Kunin, "Ion Exchange Resins", 2nd Edition, 1958, pp. 87, 89.
Gage, et al., "Science", vol. 113, pp. 522–523, (May 4, 1951).
"Chemical Abstracts", vol. 46, Abstract No. 6204f, (1952).
"Abstracts, 112th Meeting, ACS", Sep., 1947, p. 52.
"Chemical Abstracts", vol. 40, Abstract 5503, (1946).
Calmon, et al., "Ion Exchangers in Organic and Biochemistry", pp. 623–625, (1957).
Kefford, J. F., et al., "The Chemical Constituents of Citrus Fruits", Academic Press, New York, (1970), Chapters 13 and 14.
Maier, V. P. et al., Citrus Science and Technology, vol. 1, Chapters 9 and 10, (AVI Publishing Co. 1977).
N. A. Michael Eskin, Plant Pigments, Flavors and Textures (Academic Press, 1977), Chapter 5.
Ono, M., et al., "Preparation and Properties of Naringinase Immobilized by Ionic Binding to DEAE-Sephandex", (J. Ferm Tech.), vol. 55, pp. 493–500, 1977.
Olson, A. C., et al., "Naringin Bitterness of Grapefruit Juice Debittered with Naringinase Immobilized in a Hollow Fiber", (J. Food Science, V. 44, pp. 1358–1361, 1979).
Albach, R. F., et al., "Limonim Content of Juice from Marrs and Hamlin Oranges", (J. Agric. Food Chem., pp. 313–315, 1981).
Maier, et al., "Development of Methods for Producting Non-Bitter Navel Orange Juice", (Citograph, vol. 56, pp. 373–375, 1971).
Tatum, et al., "Method for Estimating Limonin Content in Citrus Juices", (J. Food Sci., vol. 38, pp. 1244 to 1246, 1973).
Chandler, B. V., et al., "Removal of Limonin from Bitter Orange Juice", (J. Sci. Food Agric.), vol. 19, pp. 83 to 86, 1968.
Hasegawa, "Metabolism of Limenoids, Limonin D-Ring Lactone Hydrolase Activity in Pseudomonas, "(J. Agric. Food Chem., vol. 24, pp. 26–26, 1976).
Kealey, et al., "Orange Juice Quality with an Emphasis on Flavor Components", (CRC Critical Previews in Food Science, vol. II, pp. 1–40, 1979).
Chandler, et al., "New Sorbent Gel Forms of Cellulose Esters for Debittering Citrus Juices", (J. Science Food Agric., vol. 30, 1979), pp. 825–832.
Chandler, et al., "Cellulose Acetate as a Selective Sorbent for Limonin in Orange Juice", (J. Science Food Agric., vol. 28, 1977), pp. 875–884.
Johnson, R. L. and B. V. Chandler, "Removal of Limonin from Bitter Navel Orange Juice," Proc. Int. Soc. Citriculture, pp. 43, 44, (1978).
Johnson, R. L., "The Reactivation of 'Exhausted' Cellulose Acetate Gel Beads Used Commercially for Debittering Orange Juice," J. Sci. Food Agric., 32: 608 to 612, (1981).
Johnson, R. L. and B. V. Chandler, "A Pilot-plant Cellulose Acetate Bead Column for the Removal of Limonin from Citrus Juices," J. Sci. Food Agric., 32:1183 to 1190, (1981).
Johnson, R. L. and B. V. Chandler, "Reactivation of the Cellulose Acetate Gel Bead Column Used for the Removal of Limonin from Citrus Juices," J. Sci. Food Agric., 32: 1191 to 1196, (1981).
Varsel, Charles, "Citrus Juice Processing as Related to Quality and Nutrition," ACS Symposium Series, No. 143, Citrus Nutrition and Quality, edited by Steven Nagy and John A. Attaway, 11: 225 to 271, (1980).
Johnson, R. L. and B. V. Chandler, "Reduction of Bitterness and Acidity in Grapefruit Juice by Adsorptive Processes," J. Sci. Food Agric., 33:287 to 294, (1982).

Primary Examiner—Raymond N. Jones
Assistant Examiner—Elizabeth J. Curtin

[57] ABSTRACT

Flavanoid and/or limonoid induced bitterness, especially naringin and/or limonin induced bitterness, is reduced in citrus fruit juice by contacting the citrus fruit juice with a styrene-divinylbenzene cross-linked copolymer adsorbent resin.

19 Claims, No Drawings

PREPARATION OF CITRUS JUICES, CONCENTRATES AND DRIED POWDERS WHICH ARE REDUCED IN BITTERNESS

BACKGROUND OF THE INVENTION

Bitter principles in citrus juices and their products are flavanoids, predominantly naringin, and/or limonoids, predominantly limonin. The chemistry and properties of these principles have been discussed in detail by J. F. Kefford and B. V. Chandler in Chapters 13 and 14 of "The Chemical Constituents of Citrus Fruits" (Academic Press, 1970); V. P. Maier, R. B. Bennett and S. Hasegawa; and R. M. Horowitz and B. Gentili in Chapters 9 and 10 of "Citrus Science and Technology" Volume I (AVI Publishing Company, 1977) respectively; and N. A. Michael Eskin in Chapter 5. of "Plant Pigments, Flavors and Textures: The Chemistry and Biochemistry of Selected Compounds" (Academic Press, 1977). The presence of bitterness is often accentuated by processing of the fruit to juice or concentrate and thus many wholesome fruits with skin blemishes are wasted because they can neither be used as fresh fruit nor can they be processed into juice.

Flavanoid bitterness is generally due to the presence of naringin (4', 5, 7,-trihydroxyflavanone-7 rhamnoglucoside). Naringin is distributed throughout the fruit, but occurs in highest concentration in the albedo. Several methods have been proposed for the reduction of naringin in citrus juices. These methods are based on the enzymatic modification of naringin to nonbitter compounds, by the action of the enzyme naringinase. D. Dinelli and F. Morisi (French Patent No. 2,125,539) discloses the use of naringinase immobilized on cellulose esters to debitter grapefruit juice. M. Ono, T. Toso and I. Chibata used naringinase immobilized on DEAE-Sephadex to debitter Natsudaidai juice (*J. Fermt. Technol,* Vol 55, p. 493-500, 1977). A. C. Olson, G. M. Gray and D. G. Guadagni debittered grapefruit juice using naringinase immobilized in hollow fibres (*J. Food Sci.,* Vol. 44, p. 1358-1361, 1979). While these techniques have been used to reduce naringin in citrus juices, they are limited in their application due to factors such as the unavailability of purified enzymes in commercial quantities, low reaction rates associated with immobilized enzymes and inadequate half life of immobilized enzymes.

Limonoid bitterness is due to the presence of the dilactone, limonin. Limonin is formed from its nonbitter precursor-limonin A-ring lactone, which is initially present in the albedo of citrus fruits. The formation of limonin from its precursor takes place in the presence of an acidic environment or upon heating. Therefore, processes of juice extraction, heat treatment, and storage of juice or concentrate result in limonin induced bitterness, especially in early season orange, Navel orange and lemon juices. Limonin levels in excess of 6 p.p.m. are detectable as bitterness.

Several approaches have been attempted to control limonin induced juice bitterness. These include preharvest considerations such as plant growth regulators, rootstocks, and a variety of other horticultural factors (R. F. Albach, G. H. Redman, and G. J. Lime in "Limonin Content of Juice from Marrs and Hamlin Oranges (*Citrus sinensis* (L.) Osbeck)." *J. Agric. Food Chem.,* Vol 29, p. 313 to 315, 1981); postharvest fruit treatments with ethylene and plant growth regulators (V. P. Maier, L. C. Brewster and A. C. Hsu in "Development of Methods for Producing Non-Bitter Navel Orange Juice." Citograph Vol 56, p. 373 to 375, 1971): the use of relatively low pressures in juice extraction to prevent disruption of the albedo (J. H. Tatum and R. E. Berry in "Method for Estimating Limonin Content of Citrus Juices." *J. Food Sci.,* Vol 38, p. 1244 to 1246, 1973); adsorption of limonin on polyamides (B. V. Chandler, J. F. Kefford and G. Ziemelis in "The Removal of Limonin from Bitter Orange Juice" in *J. Sci. Food Agric.,* Vol 19, p. 83 to 86, 1968); adsorption of limonin on cellulose esters (B. V. Chandler and R. L. Johnson, U.S. Pat. No. 3,989,854, 1976); enzymatic approaches (S. Hasegawa in "Metabolism of Limonoids, Limonin D-Ring Lactone Hydrolase Activity in Pseudomonas" in *J. Agric. Food Chem.,* Vol 24, p. 24 to 26, 1976); and the use of bitterness modulators such as neodiosmin (D. G. Guadagni, R. N. Horowitz, B. Gentili and V. P. Maier, U.S. Pat. No. 4,154,862, 1977).

U.S. Pat. No. 2,681,907; Kunin, "Ion Exchange Resins," 2nd Edition, 1958, pp 87, 89; Gage et al, "Science," Volume 113, pp 522-523 (May 4, 1951); and "Chemical Abstracts," Volume 46, Abstract No. 6202f(19) disclose removing flavanoid compounds from aqueous solutions (including plant and vegetable extracts) by treatment with an ion exchange resin. All of these references specifically disclose the use of Amberlite IRC-50 as the ion exchange resin. As shown in Table 13 on page 89 of Kunin, Amberlite IRC-50 is a cation exchanger of the carboxylic (acrylic) type which, as further disclosed on page 87 of Kunin, is prepared by the copolymerization of either methacrylic acid or acrylic acid with divinylbenzene. None of the above-listed references specifically disclose the treatment of citrus juices.

U.S. Pat. No. 4,282,264; French Patent No. 882,796; Swiss Patent No. 233, 394; Calmon et al., "Ion Exchangers in Organic and Biochemistry," 1957, pp 623-625; "Abstracts, 112th Meeting, ACS," September, 1947, page 5Q; and "Chemical Abstracts," Volume 40, Abstract 55039(19) disclose treating fruit or vegetable juices (including citrus juices) with ion exchange materials broadly.

U.S. Pat. Nos. 2,510,797 and 3,463,763 disclose debittering of citrus juices by treatment with various adsorbents which apparently do not have any ion exchange properties. More specifically, U.S. Pat. No. 2,510,797 discloses the use of activated carbon and U.S. Pat. No. 3,463,763 discloses the use of the resins polyhexamethylene adipamide and polyvinylpyrrolidone for such treatments.

The aforementioned methods have severe limitations and are not practical enough to warrant commercial application. The enzyme methods are especially undesirable because of the unavailability of economic, commercial quantities of enzymes.

Use of polyamides to debitter citrus juices results in a substantial loss of ascorbic acid from orange juice. Furthermore, a two-stage treatment of the juice is necessary due to the preferential adsorption of phenolic compounds by polyamides. This technique, therefore, would not appear to be economically advantageous.

Partial removal of flavanoids by contacting citrus juices with cellulose esters have been reported by K. S. Kealey and J. E. Kinsella in "Orange Juice Quality with an Emphasis on Flavor Components" in *CRC Critical Reviews in Food Sci. & Nutrition,* Vol 11, p. 1–40, 1979, with reference to U.S. Pat. No. 3,989,854 to Chandler, et al.

U.S. Pat. No. 3,989,854 teaches adsorption of limonin from fruit juices but not naringin adsorption on cellulose esters. Said patent discloses that cellulose esters successfully debitter navel orange juice by adsorbing limonin. However, nowhere is it disclosed or suggested that the adsorption technique can be used successfully to debitter juices/products in which naringin, or naringin in conjunction with limonin induces the bitterness. The application of cellulose esters to debitter citrus juices is thus limited to products in which the bitterness is induced solely by limonin.

The use of neodiosmin as a bitterness modulator has not found industrial application. Neodiosmin is not approved for use as a food additive and is essentially ineffective when compounds causing the bitterness are present at high levels.

Japanese Laid-Open Patent Application No 18971 Jan. 30, 1982 discloses a process for producing a citrus fruit juice which comprises the steps of subjecting fruit juice prepared by squeezing and separating in a conventional manner and sterilized as required by centrifugal separation or enzymatic treatment followed by filtration to obtain a fruit juice having insoluble solids contents of less than 0.5% (v/v), then treating same with anion exchange resins, and mixing the thus acid removed fruit juice with a nonacid removed fruit juice having insoluble solids content of more than 0.5% (v/v) in an adequate amount. Exemplified is use of an anion exchange resin regenerated with an aqueous sodium hydroxide solution.

Some persons exhibit a low tolerance to highly acidic fruit juices and therefore would prefer a reduced acid product, such as reduced acid grapefruit or orange juice. We have observed that removal of some of the acid from grapefruit juice by ion exchange, for example, seems to intensify the sensation of bitterness several fold. Therefore, in order to prepare a deacidified citrus juice, especially grapefruit juice, it is especially desirable to employ a process for debittering the juice, before or after deacidification.

SUMMARY OF THE INVENTION

It is the primary object of this invention to provide a simple, commercially advantageous process by which a variety of citrus juices can be debittered by contacting the juice with a single adsorbent resin, without impairing product quality. This bitterness may be due to the presence of either limonoids or flavanoids or both of these compounds.

To achieve this objective, the present invention primarily utilizes a commercially available polymeric adsorbent, Duolite S-861 (Diamond Shamrock, Inc., Redwood City, CA), chemically defined as a polystyrene adsorbent resin, cross-linked with divinylbenzene.

Duolite S-861 is marketed in a bead form. The preparation of a styrene-divinylbenzene cross-linked polymer is described in U.S. Pat. No. 3,238,153. Duolite S-861 is insoluble in water, dilute acids and bases and in common solvents. The resin may be used at temperatures above 100° C. The specific surface area, chemical nature of the resin's porous surface, and the physical structure of the pores facilitate fixation of amphoteric organic molecules. The hydrophobic part of the molecules is adsorbed on its porous surface.

Chemically similar polymers with similar adsorption properties are also available in other grades and sizes (ex. Duolite ES-865, also from Diamond Shamrock, Inc., SYN 42 and SYN 46, formerly from Immacti B. V., Holland, but now from Diamond Shamrock).

Selected Properties of Duolite S 861

| | |
|---|---|
| Physical form | white beads |
| Bulk density | about 0.71 |
| Specific gravity | about 1.02 |
| Moisture content | 65–70% |
| Specific surface area | about 600 $m^2/g$ dry product |
| Pore volume | about 900 $mm^3/g$ dry product |
| Swelling | about 30% between aqueous and methanolic form |
| Mean pore diameter | about 38 Angstroms |
| Particle size | 0.3–1.2 mm |

Selected Properties of Duolite Adsorbents

| Resin | Surface Area[1] $m^2/g$ | Pore Volume[2] ml/g | Mean Pore Diameter[2] Å |
|---|---|---|---|
| Duolite S-861 | 500–600 | 0.8–0.9 | 38 |
| Duolite ES-865 | 650–700 | 1.3–1.5 | 90 |

[1]determined by BET/$N_2$
[2]determined by Hg intrusion

Selected Properties of SYN Resins

| Resins | Porosity ml/g | Surf. area $m^2/g$ | Mean Pore diam. Å |
|---|---|---|---|
| SYN 42 | 0.89 | 350 | 51 |
| SYN 46 | 1.34 | 750 | 36 |

Polystyrene-divinylbenzene cross-linked copolymer adsorbant resins are approved for contact with food materials. 21 C.F.R. 177.2710 states as follows:

Styrene-divinylbenzene cross-linked copolymer resins may be safely used as articles or components of articles intended for repeated use in producing, manufacturing, packing, processing, preparing, treating, packaging, transporting, or holding food, in accordance with the following prescribed conditions:

a. The resins are produced by the copolymerization of styrene with divinylbenzene.
b. The resins meet the extractives limitations prescribed in this paragraph:
  1. The resins to be tested are ground or cut into small particles that will pass through a U.S. standard sieve No. 3 and that will be held on a U.S. STANDARD SIEVE No. 20.
  2. A 100-gram sample of the resins, when extracted with 100 milliliters of ethyl acetate at reflux temperature for 1 hour, yields total extractives not to exceed 1 percent by weight of the resins.
c. In accordance with good manufacturing practice, finished articles containing the resins shall be thoroughly cleansed prior to their first use in contact with food.

In accordance with the present invention, it has now been discovered a process for reducing either flavanoid or limonoid induced bitterness in citrus fruit juice or both flavanoid and limonoid induced bitterness in citrus fruit juice, wherein said process consists of contacting the citrus juice with a polystyrene-divinylbenzene cross-linked copolymer adsorbent resin in the absence of an added enzyme.

By the preferred procedure of the invention, naringin or limonin induced bitterness is reduced in citrus fruit juices. Especially preferred is the reduction of both naringin and limonin induced bitterness in citrus fruit juice.

While the invention will be described in connection with a preferred procedure, it will be understood that it is not intended to limit the invention to that procedure. On the contrary, it is intended to cover all alternatives, modifications, and equivalents as may be included within the spirit and scope of the invention as defined by the appended claims.

DETAILED DESCRIPTION OF THE INVENTION

This invention relates to the treatment of citrus fruit juices to reduce bitterness by adsorption of the bitter principles in the juices onto an insoluble polymeric adsorbent resin.

The citrus juices or concentrates that may be treated in accordance with the present invention to reduce bitterness include grapefruit, Japanese Summer Orange, Navel orange, water extracted soluble orange solids (WESOS), early season tangerines, Valencia, Temple, and Murcot oranges, lemon and other juices, wherein the chemical constituents contributing to bitterness are either flavanoids and/or limonoids.

The distribution of bitter principles in citrus varies from fruit to fruit. Flavanoid bitterness is dominant in grapefruit, Seville oranges and Natsudaidai (Japanese Summer Orange); limonoid bitterness is dominant in Navel oranges, grapefruits and in lemons. Limonin bitterness is particularly severe in early season fruit, for example, early season tangerines, Valencia, Temple and Navel oranges. Limonin bitterness is also associated with several citrus byproducts, for example, WESOS (Water Extracted Soluble Orange Solids), hereafter referred to as pulp wash solids.

The term "citrus juices" as used throughout this description includes not only whole juices extracted from citrus fruit but also juice that has been further processed by methods such as concentration, dilution, blending, drying, etc. The term also includes juices which may have been treated by the addition of preservatives, coloring, sweeteners, flavorings, and similar materials, it also includes deacidified citrus juices and pulp wash solids.

As a result of this invention, naringin can be effectively adsorbed from grapefruit and Japanese Summer Orange (Natsudaidai) juices; limonin can be successfully adsorbed from early season tangerine and orange, Navel orange, grapefruit and lemon juices—as well as pulp wash solids (extracts). Other bitter flavanoids analogous in chemical structure to naringin, such as poncirin, and limonoids analogous in chemical structure to limonin, such as nomilin, which are present in minor quantities in citrus products, are presumably removed by the adsorption process.

In a preferred embodiment of the present invention, the adsorbent is packed in a column, preferably a glass column. Citrus juice, either freshly extracted, heat processed, or diluted from concentrate is centrifuged in order to remove coarse pulp particles. The centrifuged juice is passed through the column. Pulp is added back to the juice after debittering.

The process may also be applied in the batch mode. Pulp-free citrus juice is contacted with the adsorbent in a vessel. Thereafter, the contents of the vessel are filtered to yield filtrate with a substantial reduction in bitterness. The fruit juice is contacted with the adsorbent resin at a temperature in the range of 1° C. to 95° C., preferably 20° C. to 35° C.

Because of the small bead size of the adsorbent employed, it is preferred to centrifuge the juice in order to minimize the possibility of clogging the column. If larger, yet uniformly sized beads with greater interstitial spaces are available, preclarification of the juice would be less important to the practical application of the process. Within the scope of the invention, the juice may be treated with fine or coarse resin using other techniques known in the art, such as placing the resin in a porous bag and contacting the bag with the juice. The treated juice may or may not be blended with other juices. However, it may be desirable to blend the treated juice with untreated juices to attain a controlled, constant and highly acceptable level of bitterness in the final product. The product may be packaged as a liquid, processed into concentrate or into a dry powder, and distributed and stored under conventional conditions.

Use of a styrene dinvinylbenzene cross-linked copolymer adsorbent resin as a means to debitter citrus juices is exemplified, in the column and batch modes, in the following examples:

SPECIFIC EMBODIMENTS

Examples 1 to 8

In these examples the adsorbent resin employed was Duolite S-861. Prior to experimentation, the resin was soaked in tap water overnight, drained and rinsed the next morning with three (3) washes of distilled water.

Example 1

A Small glass column (18 cm long×2 cm i.d.) was packed with washed Duolite S-861 adsorbent resin. The bed volume (BV) occupied by the adsorbent resin was 14 mls. Reduced acid grapefruit juice containing 762 p.p.m. naringin and 11.5 p.p.m. limonin (10.5° Brix, 31.5 Brix/Acid Ratio (B/A)—prepared from concentrate, and previously processed to reduce the acid by ion-exchange) was centrifuged. The clear juice was passed through the column at a flow rate of approximately 5 to 6 BV/hr. (about 1.5 ml/min.). Approximately 700 mls of juice were treated and collected. The ratio of the volume of adsorbent resin used to the juice treated was 1:50. Treated and untreated juice were assayed for naringin and limonin by High Pressure Liquid Chromatography (HPLC). The juice had a naringin content of 143 p.p.m.; the limonin content was 1.2 p.p.m. This translated to a naringin and limonin reduction (adsorption) of approximately 80% and 90%, respectively. The results of this experiment are presented in Table I. The treated juice (with the pulp added back) was subjected to organoleptic evaluation against untreated juice using a 14 member laboratory panel. The panelists unanimously identified the treated juice as tasting substantially less bitter than the untreated juice and they agreed that the treated juice tasted virtually nonbitter.

TABLE I

| Debittering Reduced Acid Grapefruit Juice | |
|---|---|
| Volume of Juice Treated | 700 mls. |
| Volume of Juice Treated | 50 Bed Volumes |
| Initial Naringin Content of Grapefruit Juice | 762 p.p.m. |
| Naringin Content of Treated Juice | 143 p.p.m. |

TABLE I-continued

| Debittering Reduced Acid Grapefruit Juice | |
|---|---|
| Naringin Removed (%), Treated Juice | 80% |
| Initial Limonin Content of Grapefruit Juice | 11.5 p.p.m. |
| Limonin Content of Treated Juice | 1.2 p.p.m. |
| Limonin Removed (%), Treated Juice | 90% |

The experiment was repeated several times, with minor modifications. Between each experiment, the adsorbent was successfully regenerated by washing the column either with ethanolic or alkaline (NaOH) solutions or with hot water. The reactivated resin was successfully used to debitter more citrus juice.

Since the presence of ascorbic acid in citrus juices is nutritionally significant, the ascorbic acid content of reduced acid grapefruit juice was determined before and after treatment in order to study the effect of the adsorption process on ascorbic acid levels in the juice. As can be seen from Table II only a 6.6% loss in ascorbic acid was observed upon treatment.

TABLE II

| Retention of Ascorbic Acid in Grapefruit Juice After Treatment | |
|---|---|
| Ascorbic Acid Content of Untreated Juice | 34.0 mg/100 mls |
| Ascorbic Acid Content of Treated Juice | 31.7 mg/100 mls |
| Ascorbic Acid Lost Upon Treatment | 6.6% |

Example 2

A small glass column (18 cm long×2 cm i.d.) was packed with washed Duolite S-861. The bed volume occupied by the column was 15 mls. Navel orange juice containing 8.2 p.p.m. of limonin (11.5° Brix; 15.3 B/A ratio, prepared from concentrate) was centrifuged. The clear juice was passed through the column at a flow rate of approximately 7 Bed Volumes (BV) per hour. Approximately 800 mls of the juice were treated and collected. The ratio of the volume of adsorbent used to the juice treated was 1:53. Treated and untreated juice were assayed for limonin. The treated juice had a limonin level of 1.2 p.p.m. A reduction of 85% in the limonin content was achieved using the adsorption process. The results of this experiment are shown in Table III. As judged by the sensory panel described in Example 1, a majority of the panelists identified the treated juice as tasting substantially nonbitter.

TABLE III

| Debittering Navel Orange Juice | |
|---|---|
| Volume of Juice Treated | 800 mls. |
| Volume of Juice Treated | 53 Bed Volumes |
| Initial Limonin Content of Navel Orange Juice | 8.2 p.p.m. |
| Limonin Content of Treated Juice | 1.2 p.p.m. |
| Limonin Removed (%), Treated Juice | 85% |

Example 3

A small glass column (18 cm long×2 cm i.d.) was packed with washed Duolite S-861. The bed volume (BV) occupied by the resin was 15 mls. Juice from Japanese summer oranges (Natsudaidai) having a naringin content of 915 p.p.m. (11° Brix; 4.8 B/A ratio; prepared from concentrate) was centrifuged. The clear juice was passed through the column at a flow rate of approximately 7 BV/hr. Approximately 850 mls of juice were treated and collected. The ratio of the volume of resin used to the juice treated was 1:57. Both treated and untreated juice were assayed for naringin. The treated juice had a naringin content of 280 p.p.m. A reduction of 70% in the naringin content was achieved by the adsorption process. These results are presented in Table IV.

TABLE IV

| Debittering of Japanese Summer Orange Juice | |
|---|---|
| Volume of Juice Treated | 850 mls |
| Volume of Juice Treated | 57 Bed Volumes |
| Initial Naringin Content of Japanese Summer Orange Juice | 915 p.p.m. |
| Naringin Content of Treated Juice | 280 p.p.m. |
| Naringin Removed (%), Treated Juice | 70% |

Example 4

One gram of washed Duolite S-861 was weighed into a standard 250 ml. flask. Fifty mls. of pulp-free lemon juice having a limonin content of 12.1 p.p.m. (11° Brix; 1.28 B/A ratio; prepared from concentrate) were introduced into the flask. The flask was shaken on a rotary shaker for 1 hour, the contents of the flask were filtered, and the filtrate was assayed for limonin. The limonin content of the treated juice was 0.8 p.p.m. This corresponds to a 94% reduction in the limonin content. These results are presented in Table V.

TABLE V

| Debittering of Lemon Juice | |
|---|---|
| Weight of Resin Used | 1 gram |
| Volume of Juice Treated | 50 mls |
| Initial Limonin Content of pulp-free lemon juice | 12.2 p.p.m. |
| Limonin Content of Treated Juice | 0.8 p.p.m. |
| Limonin Removed (%) | 94% |

Example 5

One gram of washed Duolite S-861 was weighed into a standard 250 ml flask. Fifty mls of pulp-free early season tangerine juice containing 34.7 p.p.m. limonin (11° Brix; 9.9 B/A ratio; prepared from concentrate) were introduced into the flask. The flask was shaken on a rotary shaker for 1 hour, the contents of the flask were filtered, and the filtrate assayed for limonin. The limonin content of the treated juice was 2.7 p.p.m. This corresponds to a 92% reduction in the limonin content. The results of this experiment appear in Table VI.

TABLE VI

| Debittering of Early Season Tangerine Juice | |
|---|---|
| Weight of Resin Used | 1 gram |
| Volume of Juice Treated | 50 mls. |
| Limonin Content of Untreated Juice | 34.7 p.p.m. |
| Limonin Content of Treated Juice | 2.7 p.p.m. |
| Limonin Removed (%), Treated Juice | 92% |

Example 6

One gram of washed Duolite S-861 was weighed into a standard 250 ml. flask. Fifty mls. of pulp-free early season Valencia orange juice containing 9.7 p.p.m. of limonin (11° Brix; 12.9 B/A ratio; prepared from concentrate) were introduced into the flask. The flask was shaken on a rotary shaker for 1 hour, the contents of the flask were filtered, and the filtrate assayed for limonin. The limonin content of the treated juice was 1.4 p.p.m. This corresponds to an 86% reduction in the limonin content. The results of this experiment are shown in Table VII.

TABLE VII

Debitterinq of Valencia Orange Juice

| | |
|---|---|
| Weight of Resin Used | 1 gram |
| Volume of Juice Treated | 50 mls. |
| Initial Limonin Content of Valencia orange juice | 9.7 p.p.m. |
| Limonin Content of Treated Juice | 1.4 p.p.m. |
| Limonin Removed | 86% |

Example 7

One gram of washed Duolite S-861 was weighed into a standard 250 ml. flask. Fifty mls of pulp-free early season pulp wash solids (WESOS), also known as water extracted soluble orange solids containing 12.2 p.p.m. limonin. (16° Brix; 17.9 B/A ratio; prepared from concentrate) were introduced on the flask. The flask was shaken on a rotary shaker for 1 hour, the contents of the flask were filtered, and the filtrate was assayed for limonin. The limonin content of the treated material was 1.4 p.p.m. This corresponds to an 88% reduction in the limonin content. The results of this experiment appear in Table VIII. The experiment was repeated on a larger scale. Both treated and untreated samples were subjected to a taste test by a six-member panel. The panelists unanimously identified the treated sample as tasting considerably less bitter than the untreated juice.

TABLE VIII

Debittering of Pulp Wash Solids

| | |
|---|---|
| Weight of Resin Used | 1 gram |
| Volume of WESOS Treated | 50 mls. |
| Initial limonin content of (WESOS) | 12.2 p.p.m. |
| Limonin Content of Treated Material | 1.4 p.p.m. |
| Limonin Removed (%) in Treated material | 88% |

Example 8

A two hundred milliliter portion of pulp-free debittered grapefruit juice and non-debittered grapefruit juice, respectively, were dried in a laboratory freeze drier. Ten grams of each dried sample were formulated into beverages and organoleptically compared by a six-member laboratory panel. The beverage prepared from the debittered dried juice was rated as being significantly less bitter than the beverage prepared from regular, dried grapefruit juice. Debittered dried citrus juices were successfully used in formulating beverages.

In Examples 1 to 8, fruit juice serum, i.e. pulp-free, was treated with Duolite S-861. It was observed that treatment of only the serum was adequate to substantially debitter the juices. This observation was supported by analytical work which revealed that flavanoids and limonoids are present in the serum in excess of 90% rather than in the pulp in most citrus juices. When pulp is removed from the juice by centrifugation/filtration prior to treatment with the adsorbent resin, it may not be necessary to recover the pulp in such a way that it need be added back to the juice from which it came. However, the economics are improved by saving and using the pulp because it is relatively low in bitterness.

Citrus products are relatively thermal labile in that they develop off-flavors if abused during processing. The experiments described above were conducted at room temperature. In a commercial operation, the upper temperature range employed in conducting the adsorption would most likely be limited by the formation of abused flavors, rather than the effect of temperature on adsorption. The maximum temperature of application is further controllable by the size of the column, the type of processing, e.g. size of a batch in a batch process and the flow rate or duration of processing. Abused flavor development is caused by a combination of time and temperature effects. The lower temperature range employed in conducting the adsorption may be primarily affected by product viscosity considerations.

With regard to product concentration, the upper range may be limited by viscosity to 30 to 40% solids. The lower concentration range may be as low as 3 to 5% solids, wherein said concentration is determined by the volume to be processed and later concentrated.

Thus, it is apparent that there has been provided, in accordance with the invention, a process for the reduction of flavanoid and/or limonoid induced bitterness that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A process for reducing either flavanoid or limonoid induced bitterness in citrus fruit juice or both flavanoid and limonoid induced bitterness in citrus fruit juice, wherein said process comprises:
    contacting the citrus juice for an effective period of time with an effective volume of a styrene-divinylbenzene cross-linked copolymer absorbent resin in the absence of an added enzyme, whereby a substantial amount of flavanoid and limonoid compounds present in the citrus juice are adsorbed by the resin.

2. The process of claim 1, wherein the juice treated to reduce bitterness include grapefruit, Japanese summer orange, Navel orange, water extracted soluble orange solids (WESOS), early season tangerines, Valencia, Temple, and Murcot oranges, lemon and other juices, wherein the chemical constituents which contribute to bitterness comprise flavanoids and limonoids.

3. The process according to claim 1 wherein the absorbent resin is packed in a column and juice passed through the column at an effective volumetric flow rate.

4. The process of claim 1, wherein pulp-free citrus juice is contacted with the adsorbent resin in a vessel at a temperature of from 1° C. to B 95° C. and the contents of the vessel are filtered to yield filtrate with a substantial reduction in bitterness.

5. The process of claim 1, wherein the fruit juice is a whole citrus juice.

6. The process of claim 1, wherein the fruit juice is a concentrated fruit juice, diluted to a concentration of 3 to 40% solids.

7. The process of claim 6, wherein the citrus fruit juice is contacted with the adsorbent resin at 1° C. to 95° C.

8. The process of claim 1, wherein the fruit juice is blended or prepared by dilution procedures.

9. The process of claim 1, wherein the fruit juice is a deacidified fruit juice.

10. The process of claim 2, wherein the water extracted soluble citrus solids to be debittered are derived by washing citrus pulp.

11. The process of claim 1, wherein the juice is derived from a product in dried form.

12. The process of claim 1, wherein the juice is clarified before treatment.

13. The process of claim 1, wherein ethanolic solutions, sodium hydroxide or other alkaline solutions or hot water treatments, are employed to regenerate the spent adsorbent resin.

14. The process of claim 1, wherein the treated juice is concentrated and/or dried.

15. The process of claim 1, wherein the serum of the fruit juice is separated from the other components thereof prior to contacting the serum with said resin, and the resin is subsequently separated from the treated serum before recombination of the treated serum with said other components.

16. The process of claim 1, wherein the citrus fruit juice is contacted with the adsorbent at 20° C. to 35° C.

17. The process of claim 1, wherein the adsorbent resin contacted with the citrus fruit juice is in bead form.

18. The process of claim 17, wherein the adsorbent resin in bead form has a pore volume of 0.8 to 0.9 ml/gram and a particle size of 0.3 to 1.2 mm.

19. The process of claim 1, wherein said citrus fruit juice comprises a reduced acid citrus fruit juice.

* * * * *